(12) United States Patent
Allen et al.

(10) Patent No.: US 6,179,524 B1
(45) Date of Patent: Jan. 30, 2001

(54) STAGGERED FAIRING SYSTEM FOR SUPPRESSING VORTEX-INDUCED-VIBRATION

(75) Inventors: Donald Wayne Allen, Katy; Dean Leroy Henning, Needville, both of TX (US)

(73) Assignee: Shell Oil Company, Houston, TX (US)

( * ) Notice: Under 35 U.S.C. 154(b), the term of this patent shall be extended for 0 days.

(21) Appl. No.: 08/970,628

(22) Filed: Nov. 14, 1997

Related U.S. Application Data

(60) Provisional application No. 60/031,269, filed on Nov. 15, 1996.

(51) Int. Cl.$^7$ ........................................................ F15D 1/10
(52) U.S. Cl. ........................ 405/211; 485/195.1; 114/263
(58) Field of Search .................................. 405/211, 216, 405/223.1, 224.2, 195.1; 114/243, 265

(56) References Cited

U.S. PATENT DOCUMENTS

| | | | |
|---|---|---|---|
| 3,410,096 | 11/1968 | Schuh | 61/46 |
| 4,171,674 | * 10/1979 | Hale | 114/243 |
| 4,365,574 | * 12/1982 | Norminton | 405/211 |
| 4,389,487 | 6/1983 | Ries | 435/273 |
| 4,474,129 | 10/1984 | Watkins et al. | 114/243 |
| 4,606,673 | 8/1986 | Daniell | 405/210 |
| 5,275,120 | * 1/1994 | Ruffa et al. | 114/243 |
| 5,410,979 | 5/1995 | Allen et al. | 114/243 |
| 5,722,340 | * 3/1998 | Sweetman | 405/211 |
| 5,738,034 | * 4/1998 | Wolff et al. | 405/211 |

FOREIGN PATENT DOCUMENTS

| | | |
|---|---|---|
| 6-103824 | 4/1994 | (JP). |
| 85/00903 | 10/1986 | (NE). |
| WO 95/26294 | 10/1995 | (WO). |
| WO 95/27101 | 10/1995 | (WO). |

OTHER PUBLICATIONS

International Search Report mailed Apr. 20, 1998.

* cited by examiner

*Primary Examiner*—David Bagnell
*Assistant Examiner*—Frederick L. Lagman

(57) ABSTRACT

A staggered fairing system is disclosed for suppressing vortex-induced vibration of a substantially cylindrical marine element in a plurality of fixed fairings are deployed. Each fairing has a leading edge substantially defined by the circular profile of the marine element and a pair of shaped sides departing from the circular profile of the marine riser and converging at a trailing edge. The connections between the marine element and the fairings through which the fairings are secured to the marine element in a non-rotative manner hold the fairings in an array of different orientations along the axis of the marine element. A method for protecting a substantially cylindrical marine element from vortex-induced vibration is also disclosed in which a plurality of fairings are installed about the marine element in a non-rotative manner so as establish an array of fairing orientations along the axis of the marine element. This serves to protect the marine element from vortex-induced vibrations over an extended range of angles of attack.

14 Claims, 3 Drawing Sheets

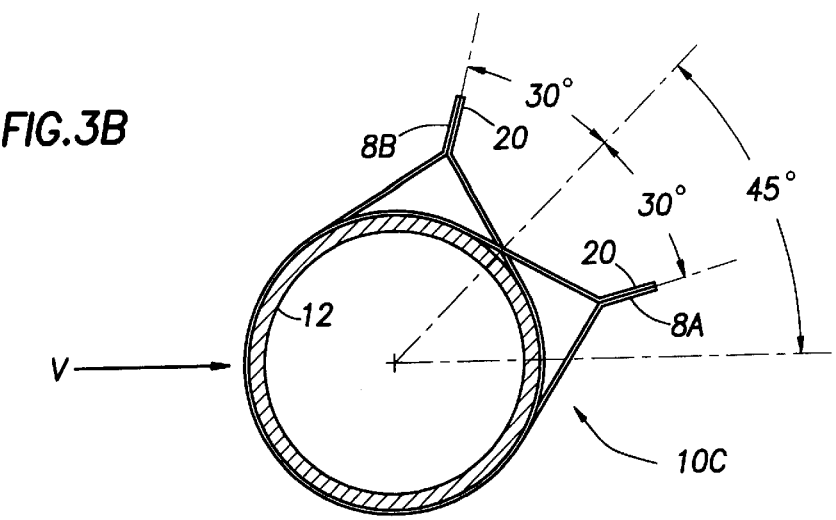
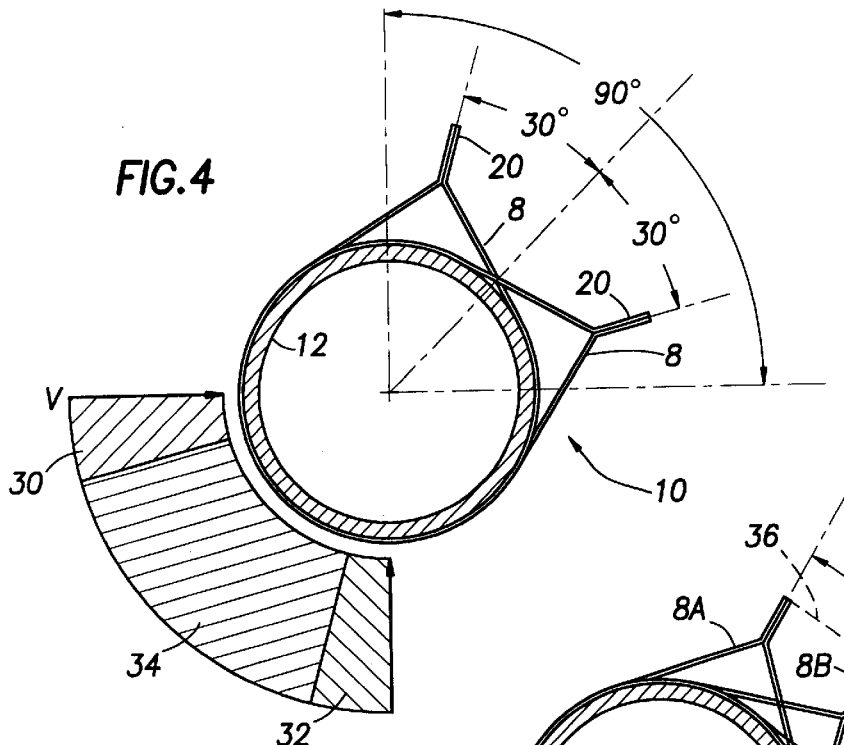
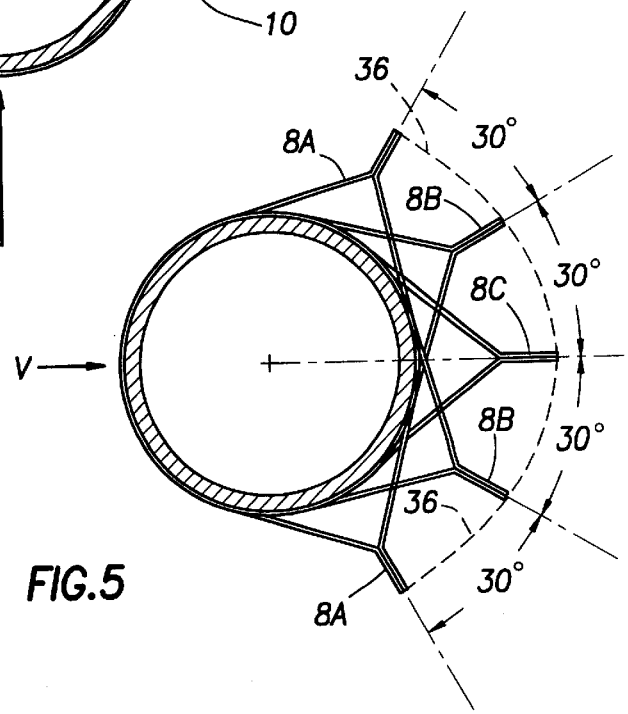

FIG. 6

STAGGERED FAIRING SYSTEM FOR SUPPRESSING VORTEX-INDUCED-VIBRATION

RELATED APPLICATIONS

This application claims priority to provisional patent application No. 60/031,269 filed Nov. 15, 1996.

BACKGROUND

The present invention relates to a method and apparatus for reducing vortex-induced-vibrations ("VIV") and, more particularly, reducing VIV in marine environments by the use of fairings.

Production of oil and gas from offshore fields has created many unique engineering challenges. One of these challenges is dealing with effects of currents on fixed cylindrical marine elements. Such marine elements are employed in a variety of applications, including, e.g., subsea pipelines; drilling, production, import and export risers; tendons for tension leg platforms; legs for traditional fixed and for compliant platforms; other mooring elements for deepwater platforms; and, although not conventionally thought of as such, the hull structure for spar type structures. These currents cause vortexes to shed from the sides of the marine elements, inducing vibrations that can lead to the failure of the marine elements or their supports.

For short cylindrical elements that are adjacent convenient means for secure mounting, the marine elements and their supports can be made strong enough to resist significant movement by the forces created by vortex shedding. Alternatively, the marine element could be braced to change the frequency at which the element would be excited by vortex shedding.

However, strengthening or bracing becomes impractical when the application requires that the unsupported segments of marine element extend for long runs. Deepwater production risers, drilling risers, platform export risers, import risers bringing in production from satellite wells, tendons for tension leg platforms, and other conduits for produced fluids and deepwater mooring elements formed from tubular goods are typical of such applications. These pipes and tubular goods serve as marine elements in applications that are difficult or impossible to brace sufficiently to satisfactorily control vibration induced by vortex shedding. Subsea pipelines traversing valleys on the ocean floor for extended, unsupported lengths and spar hulls moored at the end of long tethers and/or mooring lines provide additional examples.

Shrouds, strakes and fairings have been suggested for such applications to reduce vortex induced vibrations. Strakes and shrouds can be made to be effective regardless of the orientation of the current to the marine element. But shrouds and strakes are generally less effective than fairings and generally materially increase the drag acting on the marine element. Fairings are generally very effective in reducing vibrations due to vortex shedding, and also reduce drag forces on the marine element.

Until recently, however, fairings have been thought to be effective only if 1) the fairing had a relatively long chord to thickness ratio; 2) the relative direction of the current was close to parallel with the orientation of the fairing; and 3) the (small) diameter of the marine element and design case for current velocity were such as to combine for a relatively low Reynolds number.

U.S. Pat. No. 5,410,979 represents a significant breakthrough in providing for fixed, short fairings. Even so, short fairings having a maximum ratio of length to width of from 1.5 to as low as about 1.25 still drive cost and otherwise limit application. This length to width ratio, as a practical matter, translate to about a 1.20 minimum chord to thickness ratio for short fairings. Further, unexpected results documented in the contemporaneous filed patent application (Provisional Ser. No. 60/031,271 filed Nov. 15, 1996) of Donald W. Allen and Dean L. Henning for Ultrashort Fairings for Suppressing Vortex-Induced Vibrations show effective fairing designs for offshore applications with fairings having a chord to thickness ratio of 1.20 down to about 1.10.

Further, short and ultrashort fairings have been demonstrated effective with large diameter marine elements, such as larger diameter drilling risers and even spar hulls, which were conventionally considered unsuitable for fairings although subject to VIV problems as moored at the distal end of long tethers and/or mooring lines which provide no suitable means for bracing support.

U.S. Pat. Nos. 4,389,487 and 4,474,129 disclose fairings for use with subsea pipes and risers which are provided with means to permit the fairing to rotate around the pipe or riser as would a weathervane in order to maintain an orientation presenting the fairing parallel to the current. Accommodating this constraint results in an expensive apparatus.

Further, the subsea environment in which the fairings must operate renders likely the rapid failure of the rotational elements. Traditional fairings present a chord to thickness ratio greater than two and present a very serious problem should corrosion or marine growth cause the rotational elements to seize up. Such a failure of the fairing to rotate would cause excessive drag forces on the marine element should the current shift and no longer align with the "frozen" fairing. As a result, rotatable fairings have, in actual practice, been limited to drilling riser applications in which the risers (together with fairing mounted thereon) are frequently and routinely retrieved and not left in service for extended periods.

However, the reduced drag of misaligned short and ultrashort fairings manages this risk and such fairings have now been shown to have practical application, even if fixed. Further, the effectiveness of such short and ultrashort fairings can extend to current angles relative to the fairing (angle of attack) of up to a range approaching +/−60 degrees and somewhat higher for ultrashort fairings.

In some regions, ocean currents are sufficiently constant in direction and intensity such that normally occurring fluctuations are of little significance to fatigue life design and VIV which is controlled for currents having an angle of attack within such a window is satisfactory. However, in other regions, patterns of prevailing currents show greater variation with extended periods and higher currents across a greater deviation. There it is important to accommodate a wider range of current angles in order to avoid significant VIV precipitated degradation to fatigue life.

Thus, despite recent breakthroughs, there remains a need for economical fairings that are well adapted to applications for reducing VIV on marine elements in areas of expanded directional current fluctuations.

An advantage of the present invention is to provide an array of fixed fairings of sufficiently limited drag to as to enable an array of fixed fairing orientations to be simultaneously deployed on a single marine element, broadening the environmental conditions that will meet adequate VIV suppression while retaining the benefits of fixed fairings.

SUMMARY OF THE INVENTION

The present invention is a staggered fairing system for suppressing vortex-induced vibration of a substantially cylindrical marine element in which a plurality of fixed fairings are deployed. Each fairing has a leading edge substantially defined by the circular profile of the marine element and a pair of shaped sides departing from the circular profile of the marine riser and converging at a trailing edge. The connections between the marine element and the fairings are secured in a non-rotative manner hold the fairings in an array of different orientations along the axis of the marine element.

Another aspect of the present invention is a method for protecting a substantially cylindrical marine element from vortex-induced vibration in which a plurality of fairings are installed about the marine element in a non-rotative manner. This establishes an array of fairing orientations along the axis of the marine element whereby the marine element is protected from vortex-induced vibrations over an extended range of angles of attack.

BRIEF DESCRIPTION OF THE DRAWINGS

The brief description above, as well as further objects and advantages of the present invention, will be more fully appreciated by reference to the following detailed description of the preferred embodiments which should be read in conjunction with the accompanying drawings in which:

FIG. 3B is a cross sectional view of the multiple fairing staggered system of FIG. 1, taken at line 3B—3B in FIG. 1, illustrated in the presence of a current with a relatively high angle of attack with respect to the fairing system;

FIG. 4 is a cross sectional view of a multiple fairing staggered system illustrating schematically an increased optimum angle of attack for effective VIV suppression;

FIG. 5 is a cross sectional view of an alternate embodiment of a staggered fairing system in accordance with the present invention; and FIG. 6 is a graph plotting RMS transverse acceleration against Reynolds number for tests of a cylinder without VIV suppression and the same cylinder with a staggered fairing system subjected to currents at various angles of attack.

A DETAILED DESCRIPTION OF ILLUSTRATIVE EMBODIMENTS

Figure 1:
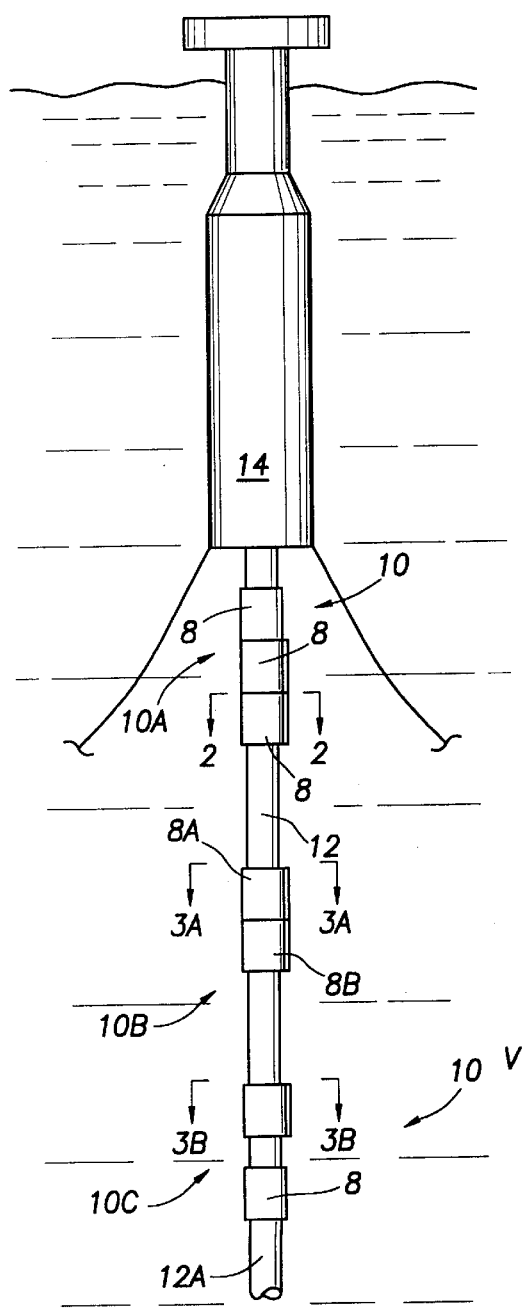
FIG. 1 is a side elevational view of a multiple fairing staggered system in accordance with the present invention deployed about a marine riser.

FIG. 1 is illustrates several fairing arrays 10 grouped as staggered fairing systems in accordance with the present invention. The staggered fairing systems are secured to a substantially cylindrical marine element 12, here riser 12A, of a schematically illustrated production mini-spar 14. Three fairing arrays 10 are shown if FIG. 1, denoted as staggered fairing systems 10A, 10B and 10C, to illustrate a range of possible embodiments. The middle array is formed from two fairings 8 arranged in different azimuthal orientations. See FIG. 3A. Here fairings 8 of staggered fairing system 10B are mounted adjacent or even as a single unit about riser 12A. Gaps may be left along the marine element, both between the arrays of staggered faring systems and between the individual fairings within an array. For an example of the latter, see staggered fairing system 10C.

Figure 2:
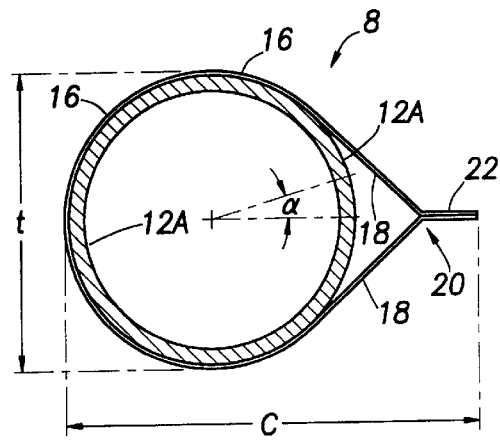
FIG. 2 is a top elevational view of a single fairing deployed about a marine element.

FIG. 2 is a top view of a single fairing 8. Fairing 8 is secured about the marine element, riser 12A, in a substantially fixed, non-rotative manner. It can be connected directly to the riser, e.g., in a tight circumferential friction engagement, or indirectly e.g., connected to buoyancy modules which are themselves connected to the riser. Some rotational slippage may be allowed in some embodiments provided: 1) not all individual fairings 8 are free to rotate to effectively weather-vane about marine element 12, or 2) fairings are secured to one another to maintain relative alignment even if the array rotates. Relative engagement of adjacent fairings 8, e.g., as in staggered fairing system 10A, may provide direct interconnection of fairings endwise to ensure an appropriate spread of orientations.

Returning to FIG. 2, fairing 8 is illustrated connected about riser 12A. The fairing has a leading edge 16 generally directed toward a possible current direction. The leading edge of fairing 8 follows the circular profile of maine element 10, departing therefrom with two shaped sides 18 converging at trailing edge 20. The trailing edge may or may not include a tail 22.

FIG. 2 also illustrates three significant parameters for fairings. These include are the chord length "c" and the thickness "t" which define the chord to thickness ratio of the fairing. Short fairing elements with a short chord to thickness ratio of about 1.5 to about 1.2 and ultrashort fairings with a chord to thickness ratio of about 1.20 to 1.10 are particularly useful for combination into arrays of staggered fairing systems in accordance with the present invention. A third parameter illustrated in FIG. 2 is the orientation of the fairing. Currents and relative position between fairings are defined in angular relationship with a line taken from the longitudinal axis of the cylindrical marine element to trailing edge 20 of the fairing. See angle alpha.

Figure 3A:
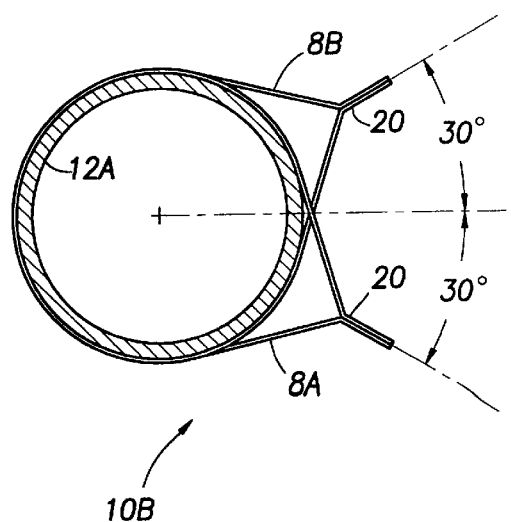
FIG. 3A is a cross sectional view the multiple fairing staggered system of FIG. 1, taken at line 3A—3A in FIG. 1, illustrated in the presence of a current with a low angle of attack.

FIG. 3A is a cross section of marine element 12 immediately above staggered faring system 10B which employs two fairings, an upper fairing 8A and a lower fairing 8B, connected about riser 12A. In this illustration, the fairings are arranged 30 degrees on either side of the nominal design current orientation, see current vector V. Thus there are 60 degrees between orientations of the respective upper and lower fairings. This is consistent with a preferred spread between adjacent fairing elements of between 20 and 60 degrees.

However, the current is not always aligned with the nominal design orientation. Thus, FIG. 3B is a similar cross section, here taken through staggered faring system 10C illustrated in FIG. 1. Here current vector V deviates substantially from the nominal orientation. Fairing 8B is itself 75 degrees out of alignment with the current. Acting alone, this would be out of the range of effective VIV suppression. However, fairing 8A is but one component of the system and fairing 8A is well within the range for angle of attack for which effective VIV suppression will be provided the cylindrical marine element 12. Within a range, this is a trade-off of some increases in drag from non-aligned fairings as other fairings in the array remain or enter into more effective VIV suppression alignment.

As a system, it appears that very effective VIV suppression is possible across at least 90 degrees of possible current variance with drag increases which remain acceptable for many of the offshore applications where VIV suppression is important. See FIG. 4 in which increased variance is denoted by areas 30 and 32 over the nominal optimal variance 34 schematically illustrated for a single fairing.

Where drag is less critical, the system can be pushed to the effective limits of individual fairings within the array, with orientations that are repeated systematically down the riser. See FIG. 5, where the array presents orientations across about a 120 degree range between fairings within the array. Here the nominal orientation is met with the whole array within an effective orientation, i.e., within 60 degrees for ultrashort fairings 8A that are most mis-aligned. However, in this embodiment, the chord to thickness ratio increases as individual fairing elements are less eccentric to the nominal current orientation. Thus, fairing element 8C which is aligned with the nominal current orientation is outside the limited "ultrashort" range. This places those fairings which are least susceptible to net drag increases and most forgiving to angle of attack on the periphery, while those that can best provide a drag reduction but with limited angular response are more nearly aligned with the nominal design current. Dotted line 36 illustrates this aspect of this embodiment. Further, some locations may have secondary as well as primary design nominal current orientations, e.g, prevalent seasonal shifts. Again, the array may be constructed to optimally address these prevalent currents as well as a range of deviant current orientations. It should also be noted that more than one staggered fairing system may be deployed on a single marine element and that it may be useful to have these disposed to different orientations. For example, a given location may be routinely subject to different currents as a function of depth in the water column. In this circumstance, different prevailing currents could be optimally addressed with staggered fairing systems deployed at various levels which are designed for the orientation, magnitude, and projected variance expected along the marine element.

Figure 6:
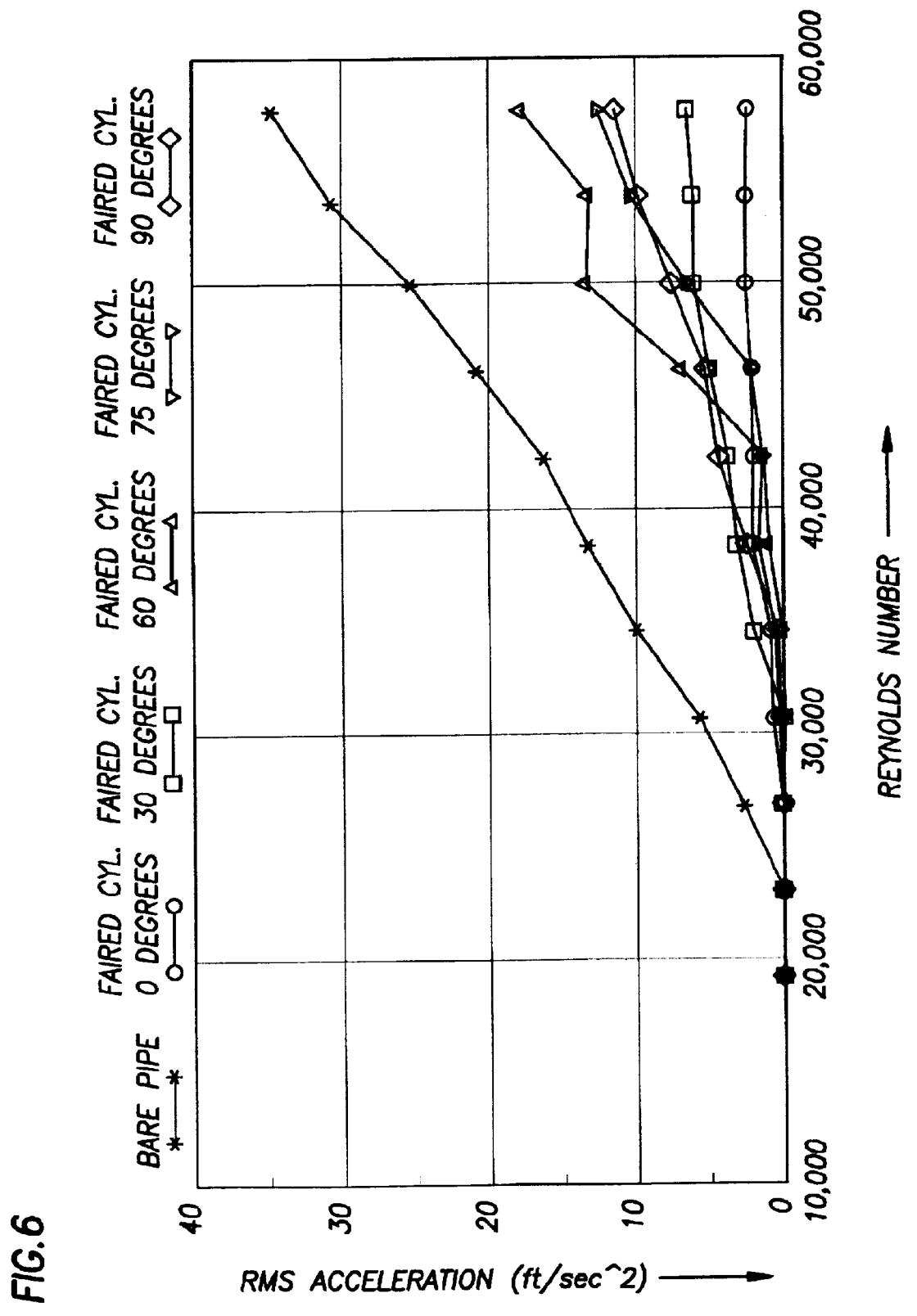

FIG. 6 is a graph plotting RMS transverse acceleration against Reynolds number for tests a staggered fairing system configured like those illustrated in FIGS. 3A, 3B and 4. This is a system of two fairings, fairings 8A and 8B about a marine element 13, oriented to plus or minus 30 degrees from the design nominal current orientation which is designated as 0 degrees for FIG. 6. VIV excitement was measured for the staggered fairing system at five different angles of attack, from 0 to 90 degrees. The base line for an unfaired test apparatus is also illustrated on the graph. Significant VIV suppression is still observed for this staggered fairing system even at an angle of attack of 90 degrees.

Although the illustrative embodiment described in detail is a production riser, those skilled in the art and provided this disclosure could readily practice the invention across a full range of other cylindrical marine elements, including, but not limited to subsea pipelines; drilling, import and export risers; tendons for tension leg platforms; legs for traditional fixed and for compliant platforms; cables and other mooring elements for deepwater platforms; and, although not conventionally thought of as such, the hull structure for spar type structures.

Other modifications, changes, and substitutions are also intended in the forgoing disclosure. Further, in some instances, some features of the present invention will be employed without a corresponding use of other features described in these illustrative embodiments. Accordingly, it is appropriate that the appended claims be construed broadly and in a manner consistent with the spirit and scope of the invention herein.

What is claimed is:

1. A staggered fairing system for suppressing vortex-induced vibration of a substantially cylindrical marine element, comprising:
    a plurality of fairings, each having chord and thickness dimensions and comprising:
        a leading edge substantially defined by the circular profile of the marine element for a distance following at least 250 degrees; and
        a pair of shaped sides departing from the circular profile of the marine element and converging at a trailing edge;
        wherein the fairing is an ultrashort faring having a chord to thickness ratio for the between about 1.20 and 1.10; and
    connections between the marine element and the ultrashort fairings through which the ultrashort fairings are fixedly secured to the marine element in a non-rotative manner, said connections securing the ultrashort fairings in an array of orientations along the axis of the marine element.

2. A staggered fairing system for suppressing vortex-induced vibration of a substantially cylindrical marine element by flow substantially transverse to the axis of the cylindrical marine element, comprising:
    a plurality of fairings, each comprising;
        a leading edge substantially defined by the circular profile of the marine element; and
        a pair of shaped sides departing from the circular profile of the marine element and converging at a trailing edge; and
    connections between the marine element and the fairings through which the fairings are fixedly secured to the marine element in a non-rotative manner, said connections securing the fairings in an array of orientations along the axis of the marine element.

3. A staggered fairing system in accordance with claim 2, wherein the fairings are short fairings having a chord and a thickness dimension with a chord to thickness ratio between about 1.5 and 1.2.

4. A staggered fairing system in accordance with claim 2, wherein the fairings are ultrashort fairings having a chord and a thickness dimension with a chord to thickness ratio between about 1.20 and 1.10.

5. A staggered fairing system in accordance with claim 2, wherein the fairings are oriented in multiple tiers of repeating patterns.

6. A staggered fairing system in accordance with claim 2, wherein the fairings are oriented in a range of random deviations from a nominal design current orientation.

7. A staggered fairing system in accordance with claim 2, wherein the fairings are spaced apart along the marine element.

8. A staggered fairing system in accordance with claim 2, wherein the fairings are secured in adjacent positions along the marine element.

9. A staggered fairing system in accordance with claim 8 wherein the fairings are interconnected to ensure relative orientation.

10. A staggered fairing system in accordance with claim 8, wherein the angle between adjacent fairings is between 20 and 90 degrees.

11. A spar structure in accordance with claim 2 wherein the range of orientations is up to 120 degrees.

12. A staggered fairing system for suppressing vortex-induced vibration of a substantially cylindrical marine element, comprising:
    a plurality of fairings, each comprising;
        a leading edge substantially defined by the circular profile of the marine element; and
        a pair of shaped sides departing from the circular profile of the marine element and converging at a trailing edge; and
    connections between the marine element and the fairings through which the fairings are fixedly secured to the marine element in a non-rotative manner, said connections securing the fairings along the axis of the marine element in an array of different angular orientations with respect to the design nominal current orientation whereby effective VIV suppression is provided the marine element for greater than a 60 degree deviation from the design nominal current orientation.

13. A method of protecting a substantially cylindrical marine element from vortex-induced vibration comprising installing a plurality of fairings about the marine element in a non-rotative manner so as to secure the fairings in an array of orientations along the axis of the marine element whereby the marine element is protected from vortex-induced vibrations over an extended range of angles of attack.

14. A method for protecting a substantially cylindrical marine element from vortex-induced-vibration in accordance with claim 13, further comprising controlling drag on the marine element by using ultrashort fairings each having chord and thickness dimensions, a leading edge substantially defined by the circular profile of the marine element for a distance following at least 250 degrees, and a pair of shaped sides departing from the circular profile of the marine riser and converging at a trailing edge; in which the chord to thickness ratio for the ultrashort fairing is between about 1.20 and 1.10.

* * * * *